US011255483B2

(12) United States Patent
Ueda

(10) Patent No.: US 11,255,483 B2
(45) Date of Patent: Feb. 22, 2022

(54) HIGH PRESSURE TANK AND METHOD OF MANUFACTURING HIGH PRESSURE TANK

(71) Applicant: TOYOTA JIDOSHA KABUSHIKI KAISHA, Toyota (JP)

(72) Inventor: Naoki Ueda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 544 days.

(21) Appl. No.: 16/167,934

(22) Filed: Oct. 23, 2018

(65) Prior Publication Data

US 2019/0195429 A1 Jun. 27, 2019

(30) Foreign Application Priority Data

Dec. 25, 2017 (JP) .............................. JP2017-247364

(51) Int. Cl.
*B29C 70/32* (2006.01)
*F17C 1/06* (2006.01)
(Continued)

(52) U.S. Cl.
CPC ................ *F17C 1/06* (2013.01); *B29C 53/84* (2013.01); *B29C 53/845* (2013.01); *B29D 22/003* (2013.01); *B65H 75/16* (2013.01); *F17C 1/16* (2013.01); *B65H 75/02* (2013.01); *F17C 2201/0104* (2013.01); *F17C 2201/0109* (2013.01); *F17C 2201/054* (2013.01); *F17C 2201/056* (2013.01); *F17C 2203/0604* (2013.01); *F17C 2203/066* (2013.01); *F17C 2203/0621* (2013.01);
(Continued)

(58) Field of Classification Search
None
See application file for complete search history.

(56) References Cited

U.S. PATENT DOCUMENTS 3,100,171 A * 8/1963 Hardesty ................ B64D 37/10
156/165
5,266,137 A * 11/1993 Hollingsworth ...... B29C 53/824
156/156
(Continued)

FOREIGN PATENT DOCUMENTS

EP        2 253 666 B1    5/2012
JP       2006300194 A    11/2006
(Continued)

*Primary Examiner* — Jeffry H Aftergut
(74) *Attorney, Agent, or Firm* — Dickinson Wright, PLLC

(57) ABSTRACT

A method of manufacturing a high pressure tank includes: preparing a liner; forming a fiber reinforced resin layer which is a layer of a fiber reinforced resin on an outer side of the liner, and forming a resin layer which is a layer formed of a portion of a thermosetting resin on an outer surface of the fiber reinforced resin layer; increasing a temperature of the fiber reinforced resin layer and the resin layer to a predetermined temperature which is a temperature at which the thermosetting resin is cured; causing a pressure in the liner to be regulated to be a second pressure higher than a first pressure which is a pressure in the liner in the forming of the fiber reinforced resin layer and the resin layer; and maintaining the temperature of the fiber reinforced resin layer and the resin layer at the predetermined temperature.

6 Claims, 10 Drawing Sheets

(51) Int. Cl.
  *F17C 1/16* (2006.01)
  *B29C 53/84* (2006.01)
  *B65H 75/16* (2006.01)
  *B29D 22/00* (2006.01)
  *B65H 75/02* (2006.01)

(52) U.S. Cl.
  CPC .............. *F17C 2203/0663* (2013.01); *F17C 2203/0665* (2013.01); *F17C 2203/0675* (2013.01); *F17C 2205/0305* (2013.01); *F17C 2205/0397* (2013.01); *F17C 2209/2154* (2013.01); *F17C 2209/232* (2013.01); *F17C 2221/012* (2013.01); *F17C 2221/033* (2013.01); *F17C 2223/0123* (2013.01); *F17C 2223/036* (2013.01); *F17C 2260/037* (2013.01); *F17C 2270/0102* (2013.01); *F17C 2270/0105* (2013.01); *F17C 2270/0168* (2013.01); *F17C 2270/0184* (2013.01); *F17C 2270/0189* (2013.01); *F17C 2270/0763* (2013.01)

(56) References Cited

U.S. PATENT DOCUMENTS

| | | | |
|---|---|---|---|
| 2011/0003947 A1* | 1/2011 | Kishi | .................... C08L 63/00 525/92 H |
| 2012/0018314 A1 | 1/2012 | Friedlmeier et al. | |
| 2014/0096895 A1 | 4/2014 | Emori | |
| 2017/0104227 A1 | 4/2017 | Otsubo | |

FOREIGN PATENT DOCUMENTS

| | | |
|---|---|---|
| JP | 2009012341 A | 1/2009 |
| JP | 2009216133 A | 9/2009 |
| JP | 2012506519 A | 3/2012 |
| JP | 2017072244 A | 4/2017 |
| JP | 2017096334 A | 6/2017 |
| JP | 5641268 B2 | 11/2017 |
| JP | 2017-219181 A * | 12/2017 |

* cited by examiner

|  | FRACTURE TOUGHNESS VALUE (MPa·m$^{0.5}$) | WHITE TURBIDITY PHENOMENON |
|---|---|---|
| FIRST EXPERIMENTAL EXAMPLE | 1.9 | △ |
| SECOND EXPERIMENTAL EXAMPLE | 1.7 | ○ |
| THIRD EXPERIMENTAL EXAMPLE | 1.4 | ○ |
| FOURTH EXPERIMENTAL EXAMPLE | 0.8 | ○ |

○ : WHITE TURBIDITY PHENOMENON NOT OCCURRED
△ : WHITE TURBIDITY PHENOMENON OCCURRED

HIGH PRESSURE TANK AND METHOD OF MANUFACTURING HIGH PRESSURE TANK

INCORPORATION BY REFERENCE

The disclosure of Japanese Patent Application No. 2017-247364 filed on Dec. 25, 2017 including the specification, drawings and abstract is incorporated herein by reference in its entirety.

BACKGROUND

1. Technical Field

The disclosure relates to a high pressure tank and a method of manufacturing a high pressure tank.

2. Description of Related Art

In the related art, a high pressure tank including a hollow liner and a fiber reinforced resin layer which is a layer of a fiber reinforced resin around the liner is known (for example, Japanese Unexamined Patent Application Publication No. 2017-096334 (JP 2017-096334 A)). In the related art, as a method of manufacturing a high pressure tank, a technique including a step of forming a fiber reinforced resin layer by winding a fiber reinforced resin which is a fiber impregnated with a thermosetting resin in an uncured state around a liner, and a step of curing the fiber reinforced resin layer through heating in a curing furnace is known (for example, JP 2017-096334 A).

SUMMARY

When the fiber reinforced resin layer is formed, the thermosetting resin in the fiber reinforced resin layer oozes out to the outer surface of the fiber reinforced resin layer such that a resin layer which is a layer of the thermosetting resin not containing fiber is formed in some cases. It was found that when the thermosetting resin is cured, gas permeation paths has hole structures are formed in the resin layer in some cases. The gas permeation path allows the inside as the liner side and the outside of the high pressure tank to communicate with each other via the resin layer.

The disclosure can be realized in the following aspects.

A first aspect of the disclosure relates to a method of manufacturing a high pressure tank. The method includes: preparing a liner having an internal space to be filled with a gas; by winding a fiber reinforced resin in which a fiber is impregnated with a thermosetting resin around an outer side of the liner, forming a fiber reinforced resin layer which is a layer of the fiber reinforced resin on the outer side of the liner, and a resin layer which is a layer formed of a portion of the thermosetting resin on an outer surface of the fiber reinforced resin layer; increasing a temperature of the fiber reinforced resin layer and the resin layer to a predetermined temperature which is a temperature at which the thermosetting resin is cured; causing, in at least a period of a period during which the increasing of the temperature is performed, a pressure in the liner to be regulated to be a second pressure higher than a first pressure which is a pressure in the liner in the forming of the fiber reinforced resin layer and the resin layer; and maintaining the temperature of the fiber reinforced resin layer and the resin layer at the predetermined temperature after the increasing of the temperature. With the method of manufacturing a high pressure tank according to the first aspect of the disclosure, by the causing the pressure in the liner to be regulated, the pressure in the liner is caused to be regulated to be the second pressure higher than the first pressure in the forming of the fiber reinforced resin layer and the resin layer in at least a period of the increasing of the temperature. Accordingly, before the curing of the fiber reinforced resin layer and the resin layer is completed, a larger amount of gas in the liner can be caused to pass through the liner and move to the outside. The gas which passes through from the inside to the outside of the liner moves to the outside while forming a hole structure in the resin layer before the curing. Therefore, it is possible to cure the thermosetting resin by the maintaining of the temperature in a state where the hole structure for gas flow is formed. Therefore, a gas permeation path which is the hole structure can be more efficiently formed in the resin layer.

In the method according to the first aspect of the disclosure, the causing of the pressure in the liner to be regulated may have increasing the pressure in the liner from the first pressure to the second pressure, maintaining the pressure in the liner at the second pressure after the increasing of the pressure, and decreasing the pressure in the liner to a third pressure lower than the second pressure after the maintaining of the pressure; and the maintaining of the pressure may be performed in a period of the period during which the increasing of the temperature is performed. With the method according to the first aspect of the disclosure, since the pressure in the liner is caused to be regulated to be the second pressure in the period of the period during which the increasing of the temperature is performed, a burden on the liner is further reduced.

In the method according to the first aspect of the disclosure, the causing of the pressure in the liner to be regulated may have increasing the pressure in the liner from the first pressure to the second pressure, the increasing of the pressure being performed between the forming of the fiber reinforced resin layer and the resin layer and the increasing of the temperature, and maintaining the pressure in the liner at the second pressure during the entire period during which the increasing of the temperature is performed. With the method according to the first aspect of the disclosure, since the pressure in the liner is caused to be regulated to be the second pressure during the entire period during which the increasing of the temperature is performed, complexity of pressure control is further suppressed.

In the method according to the first aspect of the disclosure, in the increasing of the pressure, the pressure in the liner may be increased to the second pressure by sealing an inert gas in the liner. With the method according to the first aspect of the disclosure, since the pressure in the liner is increased to the second pressure by sealing the inert gas in the liner, the concentration of oxygen in the liner can be decreased. Accordingly, deterioration of the liner due to oxidation can be further reduced.

In the method according to the first aspect of the disclosure, the inert gas may be at least one of hydrogen, nitrogen, helium, and argon. With the method according to the first aspect of the disclosure, since the molecular weight of the inert gas is small, a larger amount of the gas can be caused to pass through from the inside of the liner to the outside compared to a case of a relatively large molecular weight. Accordingly, it is possible to more efficiently form the hole structure.

In the method according to the first aspect of the disclosure, a fracture toughness value of the resin layer formed by the forming of the fiber reinforced resin layer and the resin layer may be 1.7 MPa·m$^{0.5}$ or less. With the high pressure tank according to the first aspect of the disclosure, since the fracture toughness value of the resin layer is 1.7 MPa·m$^{0.5}$ or less, it is easy for the gas to move by pushing the resin layer from the inside to the outside via the resin layer. Accordingly, compared to a case where the fracture toughness value of the resin layer is relatively high, the hole structure can be easily formed as the gas moves by pushing the resin layer from the inside to the outside via the resin layer. Therefore, the gas permeation path is formed in the resin layer even after manufacturing the high pressure tank, so that the gas permeability can be further improved.

A second aspect of the disclosure relates to a high pressure tank to be filled with a high pressure gas. The high pressure tank includes: a liner having an internal space to be filled with the gas; a fiber reinforced resin layer which is disposed on an outer side of the liner and is a layer of a fiber reinforced resin in which a fiber is impregnated with a thermosetting resin; and a resin layer which is disposed on an outer side of the fiber reinforced resin layer and is a layer of the thermosetting resin. The resin layer has a gas permeation path which is a hole structure which allows an inside and an outside to communicate with each other via the resin layer, and a fracture toughness value of the resin layer is 1.7 MPa·m$^{0.5}$ or less. With the high pressure tank according to the second aspect of the disclosure, since the fracture toughness value of the resin layer is 1.7 MPa·m$^{0.5}$ or less, it is easy for the gas to move by pushing the resin layer from the inside to the outside via the resin layer. Accordingly, compared to a case where the fracture toughness value of the resin layer is relatively high, the hole structure can be easily formed as the gas moves by pushing the resin layer from the inside to the outside via the resin layer. Therefore, the gas permeation path is formed in the resin layer even after manufacturing the high pressure tank, so that the gas permeability can be further improved.

The aspects of the disclosure can be realized in various forms other than the method of manufacturing a high pressure tank and the high pressure tank. For example, the aspects of the disclosure can be realized in the form of a vehicle having a high pressure tank mounted therein, an apparatus for manufacturing a high pressure tank, and a heating apparatus used for manufacturing a high pressure tank.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

A. First Embodiment

A1. Configuration of High Pressure Tank

Figure 1:
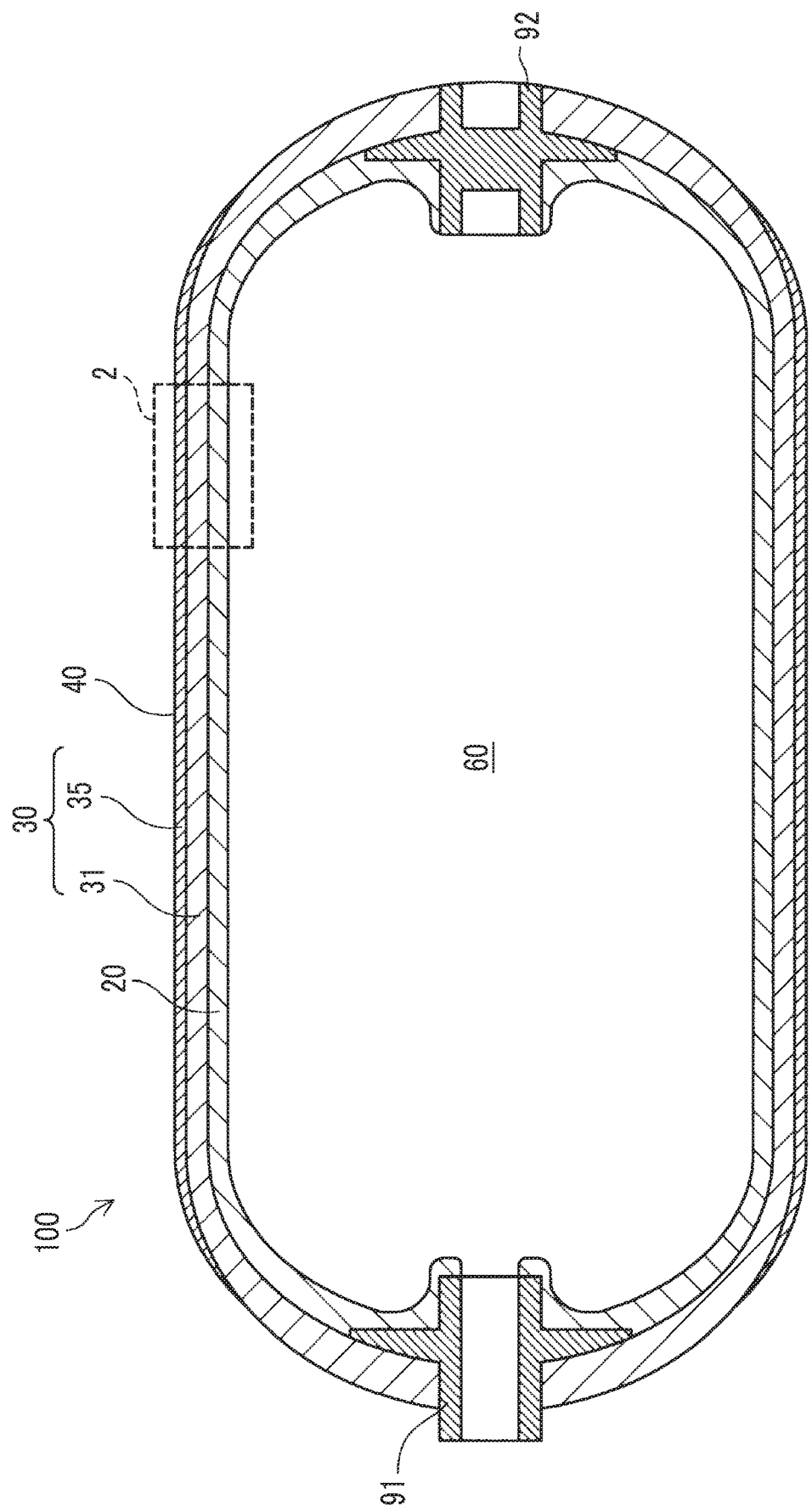
FIG. 1 is a sectional view of a high pressure tank according to a first embodiment.

FIG. 1 is a sectional view of a high pressure tank 100 according to a first embodiment. The high pressure tank 100 includes a liner 20, a fiber reinforced resin layer 30, a resin layer 40, and two end closures 91 and 92. The high pressure tank 100 is a tank for storing high pressure gas therein. In the first embodiment, the high pressure tank 100 is used to store gas (for example, hydrogen or natural gas) at a high pressure (for example, 70 MPa) gas in an internal space 60. In the first embodiment, the high pressure gas stored in the high pressure tank 100 is hydrogen. The high pressure tank 100 is loaded on, for example, a moving body such as a fuel cell vehicle having, as its power source, a fuel cell that uses hydrogen as a fuel gas. The high pressure tank 100 is not limited to the fuel cell vehicle, and may also be provided in a moving body such as a ship or an airplane, or in a stationary facility such as a house or a building.

The liner 20 has a cylindrical portion having a cylindrical shape and hemispherical dome portions disposed at both ends of the cylindrical portion. The liner 20 is a hollow container having the internal space 60 which is a space for filling the inside with the gas. The liner 20 is used as a tank element body of the high pressure tank 100. The liner 20 is formed of a resin having relatively low gas barrier properties, particularly hydrogen permeability. As the resin forming the liner 20, for example, polyamide 6, ethylene vinyl alcohol, and fully saponified polyvinyl alcohol can be used. In the first embodiment, polyamide 6 is adopted.

The fiber reinforced resin layer 30 is a layer of a fiber reinforced resin in which fiber is impregnated with a thermosetting resin, and is formed outside the liner 20. The fiber reinforced resin layer 30 may be formed in contact with the outer surface of the liner 20, or may be formed outside the liner 20 with a release agent interposed therebetween. The fiber reinforced resin layer 30 has a carbon fiber reinforced resin layer 31 containing carbon fiber and a thermosetting resin, and a glass fiber reinforced resin layer 35 containing glass fiber and a thermosetting resin. As the thermosetting resin, for example, an epoxy resin or an unsaturated polyester resin can be used. In the first embodiment, an epoxy resin is adopted. The curing rate and strength of the epoxy resin are adjusted by a cure accelerator.

The carbon fiber reinforced resin layer 31 is formed so as to cover the entire outer surface of the liner 20 and portions of the end closures 91, 92. The carbon fiber reinforced resin layer 31 is made of a carbon fiber reinforced resin (carbon fiber reinforced plastics (CFRP)) in which the carbon fiber is impregnated with the thermosetting resin, and has pressure resistance. The strength (for example, the fracture toughness degree) of the carbon fiber reinforced resin layer 31 has a relatively large contribution to the pressure resistance of the high pressure tank 100 compared to the strength of the glass fiber reinforced resin layer 35 and the resin layer 40.

The glass fiber reinforced resin layer 35 is formed so as to cover the outer surface of the carbon fiber reinforced resin layer 31. The glass fiber reinforced resin layer 35 is made of a glass fiber reinforced resin (glass fiber reinforced plastics (GFRP)) in which glass fiber is impregnated with the thermosetting resin, and has higher impact resistance than the carbon fiber reinforced resin layer 31.

The resin layer 40 is formed on the outer surface of the glass fiber reinforced resin layer 35. The resin layer 40 is made of a thermosetting resin not containing fiber. The resin layer 40 is formed of the same thermosetting resin as the thermosetting resin used for the glass fiber reinforced resin layer 35.

The end closures 91, 92 include a first end closure 91 and a second end closure 92. The first end closure 91 has a substantially cylindrical shape having a through-hole that communicates with the inside of the liner 20. The first end closure 91 functions as an opening of the high pressure tank 100 and also functions as an attachment portion for attaching pipes and valves to the high pressure tank 100. The second end closure 92 has a substantially columnar shape having no through-hole. The second end closure 92 has a function of conducting the heat inside the high pressure tank 100 to the outside. The end closures 91, 92 also function as attachment portions for attaching the liner 20 to a filament winding apparatus when the fiber reinforced resin layer 30 is used. Metals such as stainless steel and aluminum can be used for the end closures 91, 92.

Figure 2:
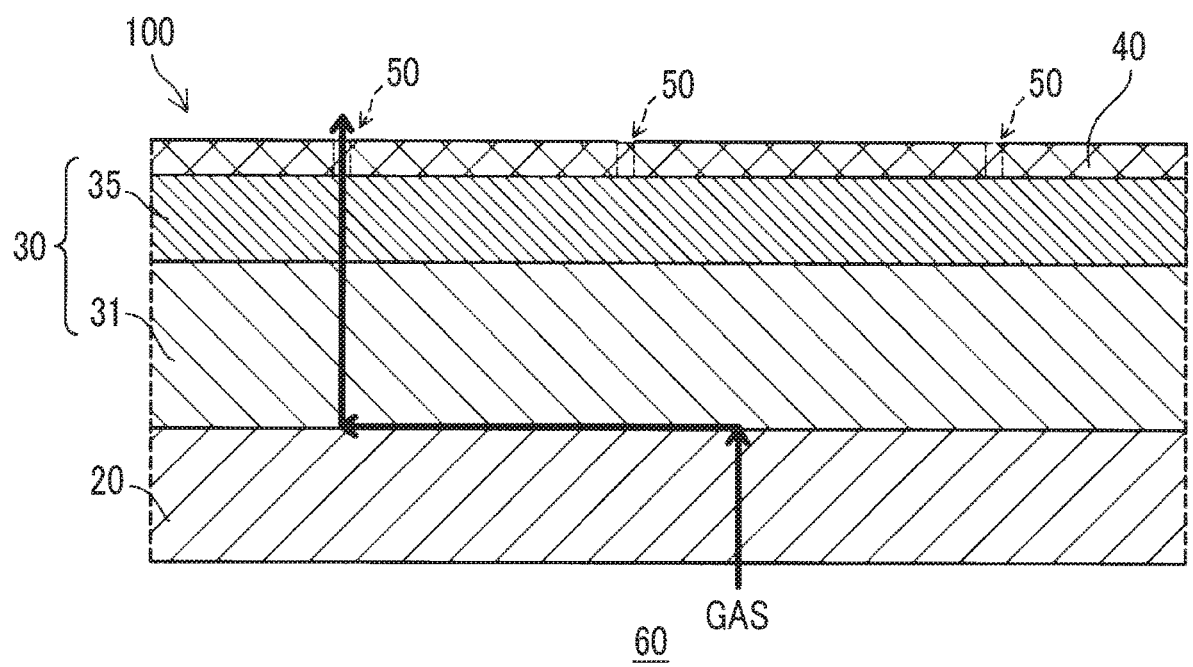
FIG. 2 is a schematic view illustrating a sectional structure of the high pressure tank according to the first embodiment.

FIG. 2 is a schematic view illustrating a sectional structure of the high pressure tank 100 according to the first embodiment. FIG. 2 is an enlarged view of a region surrounded by broken line 2 in FIG. 1. In the first embodiment, a plurality of gas permeation paths 50 is formed in the high pressure tank 100. The gas permeation path 50 has a hole structure which enables the inside (the liner 20 side) and the outside to communicate with each other via the resin layer 40.

The fiber reinforced resin layer 30 has a region containing fiber and a region which is solely formed of a resin without containing fiber. The region containing fiber has a relatively small density compared to the region solely formed of the resin. Since the fiber reinforced resin layer 30 contains the fiber, the fiber reinforced resin layer 30 has gas permeability. In the region solely formed of the resin, voids serving as flow paths of gas are formed.

The resin layer 40 has the gas permeation paths 50. By having the gas permeation paths 50, the resin layer 40 allows gas to flow between the inside (the liner 20 side) and the outside (the outside of the high pressure tank 100) with the resin layer 40 interposed therebetween. The gas permeation paths 50 are evenly formed in the resin layer 40.

When the high pressure tank 100 filled with the gas is used, the gas filling the internal space 60 may pass through the liner 20 and flow to the fiber reinforced resin layer 30 side. The gas flowing to the fiber reinforced resin layer 30 side can move in a direction along the boundary between the liner 20 and the fiber reinforced resin layer 30. As the gas flowing to the fiber reinforced resin layer 30 side moves in the direction along the boundary between the liner 20 and the fiber reinforced resin layer 30, the gas moves to the region containing the fiber or the voids with relatively high gas permeability in the fiber reinforced resin layer 30. The moved gas moves to the resin layer 40 side. The gas moved to the resin layer 40 side is released to the outside of the resin layer 40 via the gas permeation paths 50 formed in the resin layer 40.

A2. Method of Manufacturing High Pressure Tank

Figure 3:
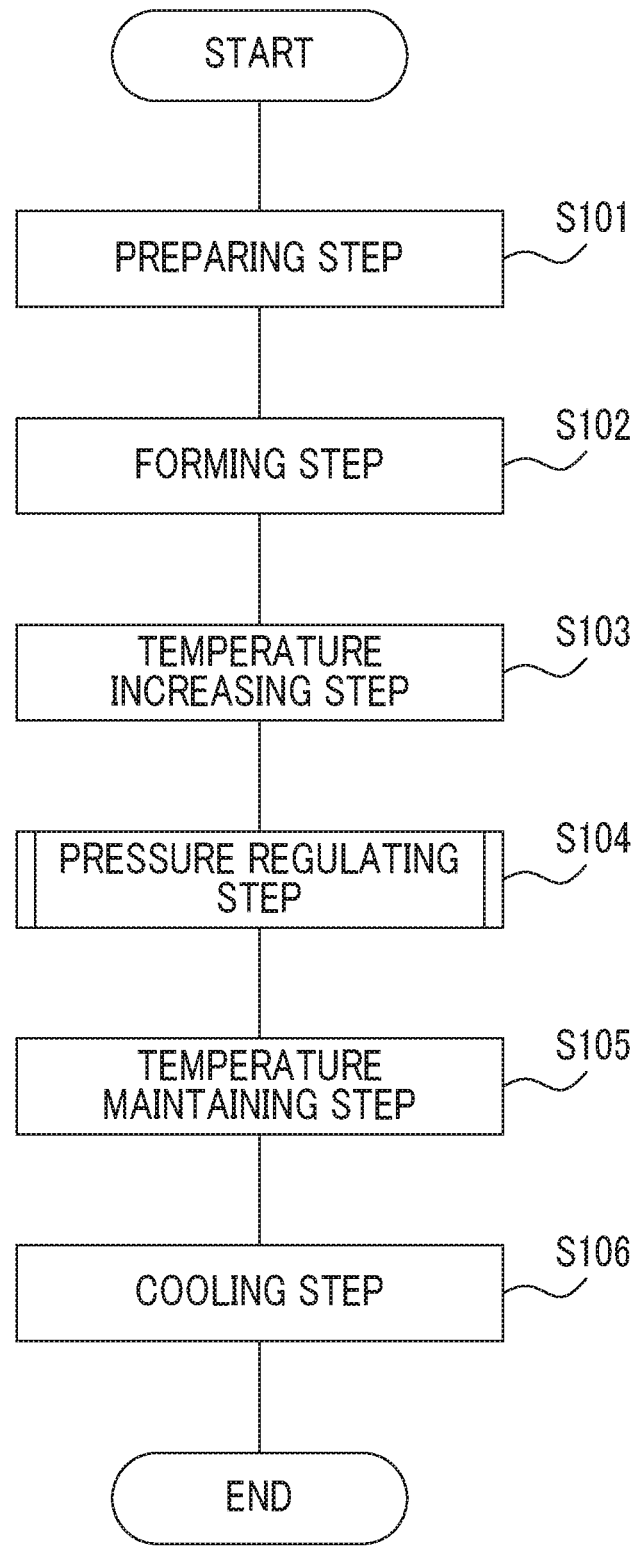
FIG. 3 is a flowchart for describing a manufacturing process of the high pressure tank according to the first embodiment.

FIG. 3 is a flowchart for describing a manufacturing process of the high pressure tank 100 according to the first embodiment. Hereinafter, the manufacturing process of the high pressure tank 100 according to the first embodiment will be described with reference to FIG. 3. In the manufacturing process of the high pressure tank 100, a preparing step as step S101, a forming step as step S102, a temperature increasing step as step S103, a pressure regulating step as step S104, a temperature maintaining step as step S105, and a cooling step as step S106 are performed. Hereinafter, an uncured layer structure which is to become the fiber reinforced resin layer 30 through the temperature maintaining step (step S105) will be described using the same reference numeral as the fiber reinforced resin layer 30. An uncured layer structure which is to become the resin layer 40 through the temperature maintaining step (step S105) will be described using the same reference numeral as the resin layer 40. One in a state in which the uncured fiber reinforced resin layer 30 and the uncured resin layer 40 are formed on the outer side of the liner 20 is described as a workpiece 80.

The preparing step (step S101) is a step of preparing the liner 20. In the first embodiment, the liner 20 is prepared, for example, by welding together dome portions and a cylindrical portion, which are separately molded by injection molding or extrusion molding of polyamide 6. The end closures 91, 92 are attached to the prepared liner 20. In the first embodiment, the end closures 91, 92 are attached by press fitting. As the liner 20, a liner that has been already formed may be prepared and used.

After the preparing step (step S101), the forming step (step S102) is performed. The forming step (step S102) is a step of forming the uncured fiber reinforced resin layer 30 and the uncured resin layer 40 by winding the fiber reinforced resin around the outer side of the liner 20. In the first embodiment, the forming step (step S102) is performed as follows. By winding the carbon fiber reinforced resin around the outer side of the liner 20, an uncured carbon fiber reinforced resin layer 31 is formed. After the uncured carbon fiber reinforced resin layer 31 is formed, the glass fiber reinforced resin is wound around the outer side of the uncured carbon fiber reinforced resin layer 31, whereby an uncured glass fiber reinforced resin layer 35 is formed. For winding the fiber reinforced resin, a filament winding method (FW method) is used. After the uncured fiber reinforced resin layer 30 is formed, the resin layer 40 is formed. The resin layer 40 is formed of a portion of the thermosetting resin oozed out to the outer side, the thermosetting resin being used in the uncured fiber reinforced resin layer 30, particularly in a region having a relatively low fiber density in the glass fiber reinforced resin layer 35. In a case where a release agent is applied to the outer surface of the liner 20, the carbon fiber reinforced resin is wound around the outer side of the liner 20 after the applied release agent is dried.

In the forming step (step S102), the pressure in the liner 20 is adjusted to be a first pressure determined in advance. The first pressure is set to a pressure at which strain of the liner 20 can be further suppressed in the forming step (step S102) and the liner 20 is not broken by the pressure in the liner 20. Examples of the strain of the liner 20 in the forming step include strain of the liner 20 due to the weight of the liner 20 and the weight of the wound fiber reinforced resin, and strain due to a pressure applied to the fiber reinforced resin at the time of the winding. In the first embodiment, a target value of the first pressure is 0.7 MPa. In the forming step (step S102), the pressure in the liner 20 needs not be strictly adjusted to be 0.7 MPa in terms of actual value, and may be adjusted to be, for example, in a range of 0.65 MPa to 0.75 MPa inclusive. In the first embodiment, the pressure in the liner 20 is increased to the first pressure as a first gas which is an inert gas is sealed in the liner 20. The inert gas means a gas having a relatively low reactivity with a forming member of the liner 20 (polyamide 6 in the first embodiment). In the first embodiment, a mixed gas of nitrogen and helium is adopted as the first gas.

Figure 4:
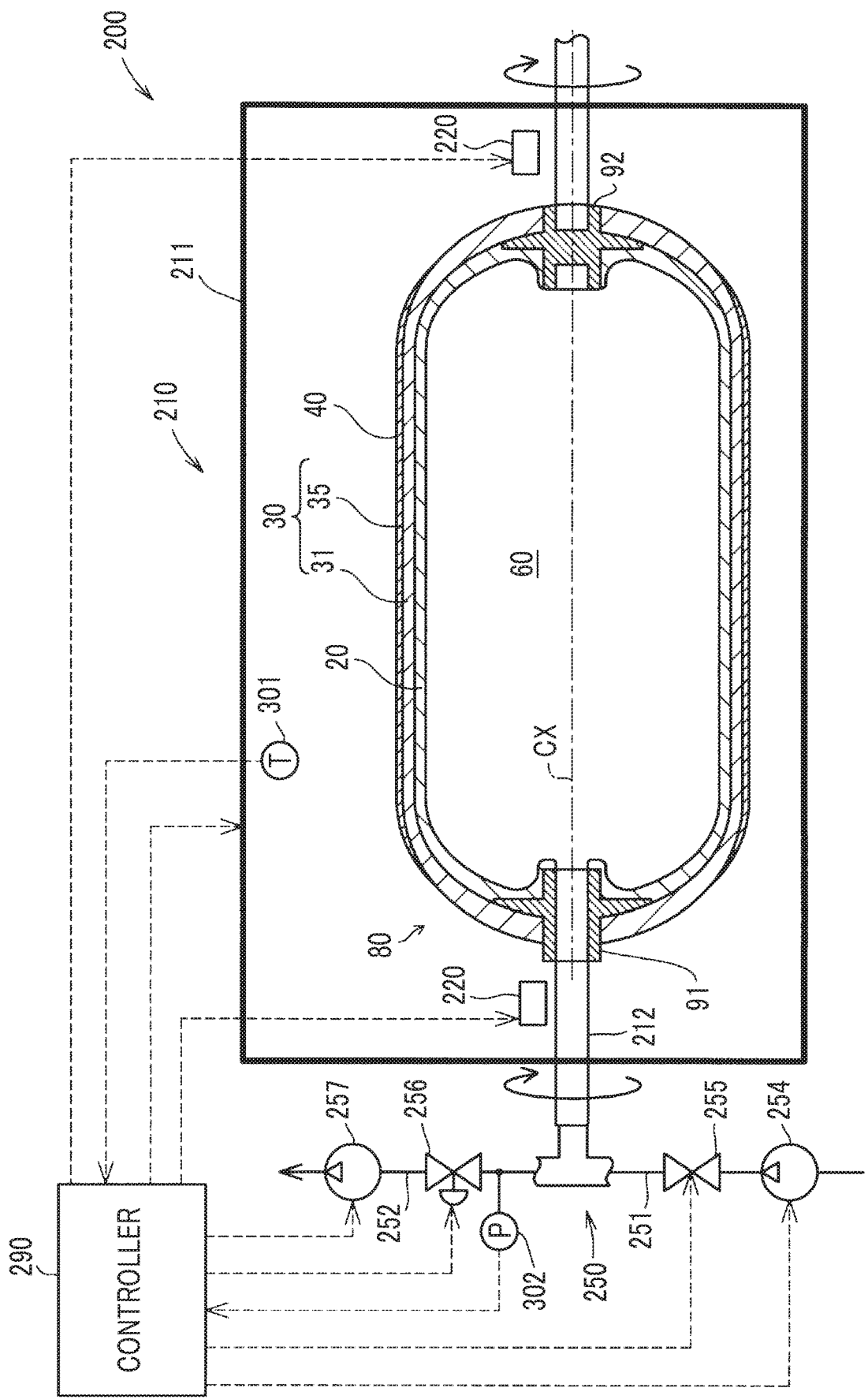
FIG. 4 is a schematic view of a heating apparatus used in the first embodiment.

FIG. 4 is a schematic view of a heating apparatus 200 used in the first embodiment. When the forming step (step S102) is completed, the workpiece 80 is set in the heating apparatus 200. The heating apparatus 200 is used in the temperature increasing step (step S103), the pressure regulating step (step S104), and the temperature maintaining step (step S105).

The heating apparatus 200 (FIG. 4) includes a heating mechanism 210 that heats the workpiece 80, a pressure regulating mechanism 250 that regulates the pressure in the liner 20, and a controller 290 that controls the heating mechanism 210 and the pressure regulating mechanism 250.

The heating mechanism 210 includes a heating furnace 211, a rotating portion 212, and an infrared (IR) heater 220. The heating furnace 211 is a heating apparatus having therein a space in which the workpiece 80 is disposed. The heating furnace 211 heats the workpiece 80 disposed therein from the outer surface side by increasing the temperature of the internal space. The rotating portion 212 is attached to the end closures 91, 92 and functions as a tool that fixes the workpiece 80 in the heating furnace 211. The rotating portion 212 also functions as a pipe that connects the first end closure 91 which is an opening of the workpiece 80 to the pressure regulating mechanism 250. The IR heater 220 is disposed so that the rotating portion 212 can be heated. As the rotating portion 212 is heated by the IR heater 220, the end closures 91, 92 connected to the rotating portion 212 are heated, and the fiber reinforced resin layer 30 (particularly peripheral portions of the end closures 91, 92) is heated from the inside via the end closures 91, 92. Accordingly, the peripheral portions of the end closures 91, 92, which are greater than the other regions in the thickness of the fiber reinforced resin layer 30, can be heated from the inside. The rotating portion 212 is rotated around a rotation axis CX by a drive portion (not illustrated). Accordingly, the workpiece 80 connected to the rotating portion 212 rotates in the heating furnace 211, so that nonuniform heating of the workpiece 80 can be further suppressed. As the rotating portion 212 is rotated, nonuniform heating of the rotating portion 212 by the IR heater 220 can be further suppressed. The heating mechanism 210 heats the workpiece 80 is heated using both the heating furnace 211 and the IR heater 220. Accordingly, the temperature difference between the inner side (the fiber reinforced resin layer 30) and the outer side (the resin layer 40) of the workpiece 80 can be further reduced at the time of increasing the temperature of the workpiece 80. A temperature sensor 301 which measures the surface temperature of the workpiece 80 and the temperatures of the end closures 91, 92 are disposed inside the heating furnace 211. Temperature information measured by the temperature sensor 301 is transmitted to the controller 290. The controller 290 adjusts the output of each of the heating furnace 211 and the IR heater 220 according to the received temperature information.

The pressure regulating mechanism 250 includes a supply flow path 251 through which a second gas that is to be sealed in the workpiece 80 flows and a recovery flow path 252 through which the second gas discharged from the workpiece 80 is recovered. The pressure regulating mechanism 250 adjusts the pressure in the liner 20 by performing pressurization by sealing the second gas in the workpiece 80 with and performing depressurization by recovering the second gas sealed therein. In the supply flow path 251, a pressurizing pump 254 that pumps the second gas in a direction toward the workpiece 80 is disposed. An on-off valve 255 is disposed between the pressurizing pump 254 and the workpiece 80 in the supply flow path 251. The on-off valve 255 switches to any one of a state in which the pressurizing pump 254 side and the workpiece 80 side do not communicate with each other and a state in which the pressurizing pump 254 side and the workpiece 80 side communicate with each other via the on-off valve 255 in the supply flow path 251. A depressurizing pump 257 for assisting recovery of the second gas sealed in the liner 20 is disposed in the recovery flow path 252. A pressure regulating valve 256 is disposed between the depressurizing pump 257 and the workpiece 80 in the recovery flow path 252. The pressure regulating valve 256 is a valve mechanism capable of adjusting the flow path width of the recovery flow path 252 in stages. A pressure sensor 302 for measuring the pressure in the space between the workpiece 80 and the pressure regulating valve 256 is disposed in the recovery flow path 252. Pressure information measured by the pressure sensor 302 is transmitted to the controller 290. The controller 290 adjusts the pressure in the liner 20 by controlling the pressurizing pump 254, the on-off valve 255, the pressure regulating valve 256, and the depressurizing pump 257 according to the received pressure information. The second gas used in the pressure regulating mechanism 250 is an inert gas similar to the first gas used in the forming step (step S102). In this case, it is easy to recycle the gas recovered from the inside of the liner 20 as the first gas and the second gas.

Figure 5:
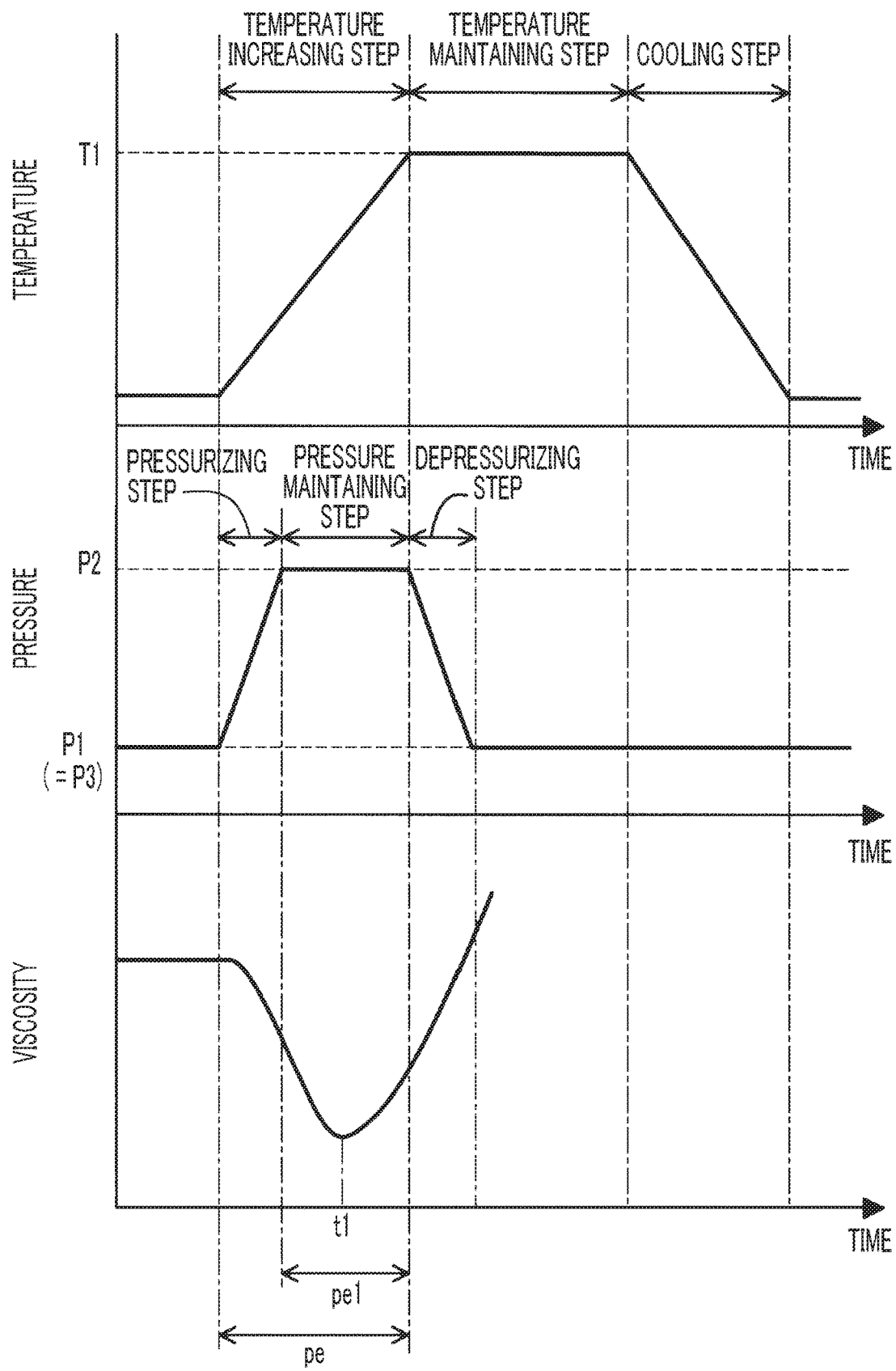
FIG. 5 is a graph for describing a relationship between a pressure regulating step and a temperature increasing step in the first embodiment.

FIG. 5 is a graph for describing the relationship between the pressure regulating step (step S104 in FIG. 3) and the temperature increasing step (step S103 in FIG. 3) in the first embodiment. The temperature increasing step (step S103) is a step of increasing the temperature of the fiber reinforced resin layer 30 and the resin layer 40 to a predetermined target temperature T1. The target temperature T1 is a temperature at which the thermosetting resin used in the fiber reinforced resin layer 30 and the resin layer 40 is thermally cured, and is determined according to the kind of the thermosetting resin used. The temperature increasing step (step S103) is performed by heating the fiber reinforced resin layer 30 and the resin layer 40 using the heating mechanism 210. In the temperature increasing step (step S103), the thermosetting resin contained in the fiber reinforced resin layer 30 and the resin layer 40 decreases in viscosity until time t1 at which a thermal curing reaction starts, according to the relationship between viscosity and temperature shown in the Andrade equation for viscosity. After time t1 at which the thermal curing starts, the thermal curing reaction in the thermosetting resin proceeds with the lapse of time, so that the viscosity increases. In the first embodiment, the temperature of the fiber reinforced resin layer 30 and the resin layer 40 in the temperature increasing step (step S103) is measured by the controller 290 according to the temperature information transmitted from the temperature sensor 301.

The fiber reinforced resin layer 30 and the resin layer 40 contain bubbles formed in the fiber reinforced resin layer 30 and the resin layer 40 in the process of the forming step (step S102 in FIG. 3) and bubbles formed by the gas which has passed through the liner 20 and has moved to the fiber reinforced resin layer 30 side. In a case where the viscosity of the thermosetting resin of the fiber reinforced resin layer 30 and the resin layer 40 is a viscosity at which bubbles can move, the bubbles contained in the fiber reinforced resin layer 30 and the resin layer 40 move outward. The fact that bubbles can move means that the resistance against the bubbles is relatively smaller than the buoyancy acting on the bubbles. The higher the viscosity of the thermosetting resin, the higher the resistance against the bubbles. As the bubbles move by pushing the uncured thermosetting resin, hole structures are formed in the fiber reinforced resin layer 30 and the resin layer 40. Before the hole structures formed by the flow of the thermosetting resin are blocked, the fiber reinforced resin layer 30 is cured to form voids, and the resin layer 40 is thermally cured to form the gas permeation paths 50.

In the temperature increasing step (step S103), by heating the end closures to a temperature higher than the target temperature T1, the fiber reinforced resin layer 30 and the resin layer 40 are heated from the liner 20 side (inside). Accordingly, compared to a case where the fiber reinforced resin layer 30 and the resin layer 40 are increased in temperature by heating the workpiece 80 solely from the outside using the heating furnace 211, the difference in temperature increasing rate between the resin layer 40 and the fiber reinforced resin layer 30 is further suppressed. As a result, the fiber reinforced resin layer 30 and the resin layer 40 are increased in temperature so that a period during which the viscosity of the fiber reinforced resin layer 30 decreases and a period during which the viscosity of the resin layer 40 decreases overlap. In the first embodiment, the IR heater 220 is controlled so that the temperature of the end closures 91, 92 in the temperature increasing step (step S103) reaches 160° C.

The pressure regulating step (step S104) is a step of causing the pressure in the liner 20 to be a second pressure P2 higher than the first pressure P1, which is the pressure in the liner 20 in the forming step (step S102), at least in a period pe1 of a period pe during which the temperature increasing step (step S103) is performed.

Figure 6:
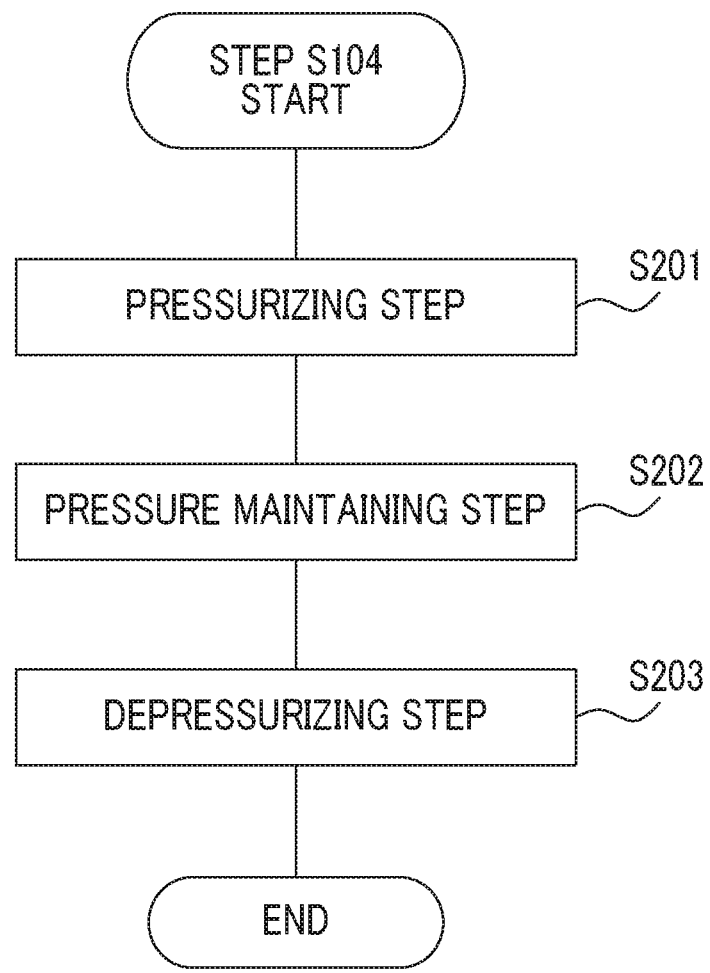
FIG. 6 is a flowchart for describing each step of the pressure regulating step according to the first embodiment.

FIG. 6 is a flowchart for describing each step of the pressure regulating step (step S104). In the pressure regulating step (step S104), a pressurizing step (step S201), a pressure maintaining step (step S202), and a depressurizing step (step S203) are performed.

The pressurizing step (step S201) is a step of increasing the pressure in the liner 20 from the first pressure P1 to the second pressure P2. In the pressurizing step (step S201), the pressure in the liner 20 is pressurized to the second pressure P2 by sealing the second gas in the liner 20 by the pressure regulating mechanism 250 (FIG. 4). The second pressure P2 is a pressure which is higher than the first pressure P1 and is lower than the pressure at which the liner 20 is broken by the pressure in the liner 20. The second pressure P2 is not particularly limited, but is equal to or more than desirably 1.2 times, and more desirably 1.35 or more times the first pressure P1. In the first embodiment, a target value of the second pressure P2 is 0.95 MPa. Since the uncured fiber reinforced resin layer 30 is formed on the outer side of the liner 20 in the pressurizing step (step S201), it is possible for the liner 20 to withstand a relatively high pressure compared to the forming step (step S102).

After the pressurizing step (step S201), the pressure maintaining step (step S202) is performed. The pressure maintaining step (step S202) is a step of maintaining the pressure in the liner 20 at the second pressure P2. In the pressure maintaining step (step S202), the pressure in the liner 20 needs not be strictly adjusted to be 0.95 MPa, and may be adjusted to be in a range of, for example, 0.90 MPa to 1.0 MPa inclusive. As shown in FIG. 5, since the temperature increasing step (step S103) is performed at time t1 within the period pe1 during which the pressure maintaining step (step S202) is performed, the viscosity of the thermosetting resin of the uncured fiber reinforced resin layer 30 and the uncured resin layer 40 becomes the lowest viscosity.

When the pressure maintaining step (step S202) is completed, the depressurizing step (step S203) is performed. The depressurizing step (step S203) is a step of decreasing the pressure in the liner 20 to a third pressure P3 lower than the second pressure P2. In the depressurizing step (step S203), depressurization is performed by recovering the first gas and the second gas sealed in the liner 20 using the pressure regulating mechanism 250. By depressurizing the liner 20, a burden on the liner 20 caused by the application of an internal pressure is further reduced. The third pressure P3 is a pressure at which deformation of the liner 20 disposed in the heating apparatus 200 due to its own weight can be further suppressed and a pressure lower than the second pressure P2. In the first embodiment, the third pressure P3 is set to the same pressure as the first pressure P1. The third pressure P3 is not limited thereto. The third pressure P3 may be lower than the first pressure P1 or higher than the first pressure P1.

After the pressure regulating step (step S104), the temperature maintaining step (step S105) is performed. In the first embodiment, the temperature maintaining step (step S105) is started after the pressure regulating step (step S104) is started. The temperature maintaining step (step S105) is a step of maintaining the temperature of the fiber reinforced resin layer 30 and the resin layer 40 at the target temperature T1. The target temperature T1 is a temperature higher than the curing temperature of the thermosetting resin being used. In the first embodiment, the target temperature T1 is 140° C. In the temperature maintaining step (step S105 in FIG. 3), by alternately stopping and resuming the heating of the fiber reinforced resin layer 30 and the resin layer 40 using the heating mechanism 210, the temperature of the fiber reinforced resin layer 30 and the resin layer 40 is maintained at the target temperature T1. In the temperature maintaining step (step S105), the temperature of the fiber reinforced resin layer 30 and the resin layer 40 need not be strictly maintained at the target temperature T1. The temperature of the fiber reinforced resin layer 30 and the resin layer 40 may be adjusted to be substantially the target temperature T1, for example, a temperature of 135° C. to 145° C. inclusive. By the temperature maintaining step (step S105), curing of the fiber reinforced resin layer 30 and the resin layer 40 is completed.

As shown in FIGS. 3 and 5, the cooling step (step S 106) is performed after the temperature maintaining step (step S105). The cooling step (step S106) is a step of cooling the formed high pressure tank 100 to room temperature (for example, 25° C.). In the cooling step (step S106), for example, the high pressure tank 100 is cooled by ventilation of the heating apparatus 200 and natural heat dissipation. When the cooling of the high pressure tank 100 is completed, the high pressure tank 100 is removed from the heating apparatus 200. Accordingly, the manufacturing process of the high pressure tank 100 is completed.

According to the first embodiment described above, as shown in FIG. 5, in the temperature increasing step (step S103) before the curing of the fiber reinforced resin layer 30 and the resin layer 40 is completed, the pressure maintaining step (step S202) in which the pressure in the liner 20 is maintained at the second pressure is performed. The depressurizing step (step S203) is performed after time t1 at which the increase in viscosity due to the curing of the thermosetting resin starts. The gas permeability of the liner 20 with a high internal pressure is higher than that with a relatively low internal pressure. Therefore, by increasing the pressure in the liner 20 from the first pressure to the second pressure, the amount of the gas that passes through the liner 20 to the outside can be increased. The gas permeability of the liner 20 is higher in a case where the temperature of the liner 20 is higher than in a case where the temperature of the liner 20 is relatively low. Therefore, in the period pe1 including the period during which the viscosity of the thermosetting resin is low, that is, the movement of the gas proceeds most smoothly, the amount of the gas passing through the liner 20 increases. The gas passing through the liner 20 to the outside moves to the outside while forming the hole structures in the resin layer 40 before being cured. Therefore, by curing the resin layer 40 in a state in which the hole structures for the flow of the gas are formed, the gas permeation paths 50 are more efficiently formed. Since the amount of the gas passing through the liner 20 increases as the molecular weight of the gas decreases, the molecular weights of the first gas and the second gas are not particularly limited, but are desirably small. Specifically, although not particularly limited, the molecular weight of the gas is desirably equal to or less than 40, and more desirably equal to or less than the molecular weight of the air (molecular weight 29). In the first embodiment, a mixed gas of helium and nitrogen with a molecular weight smaller than that of the air is used as the first gas and the second gas. Accordingly, in the pressure maintaining step (step S202), the amount of the gas that passes through the liner 20 to the outside can be increased. Therefore, the gas permeation paths 50 more efficiently formed. Since the gas permeation paths 50 are more efficiently formed in the resin layer 40, it is possible to increase gas permeability in the resin layer 40.

According to the first embodiment, a mixed gas of helium and nitrogen, which is an inert gas, is used as the first gas and the second gas which are gases sealed in the liner 20. In a case where an inert gas is used as the first gas and the second gas, it is possible to relatively reduce the proportion of an active gas (for example, oxygen) in the gas sealed in the liner 20 compared to a case where a gas other than the inert gas is used. Therefore, the deterioration of the liner 20 due to the oxidation reaction between the liner 20 and the oxygen sealed in the liner 20 is further suppressed, and the durability (for example, allowable tensile stress) of the liner 20 is further improved. In the high pressure tank 100 according to the first embodiment, even in a case where stress is concentrated on the liner 20, the durability of the liner 20 is further improved, so that it is possible to further reduce the risk of breakage of the liner 20. For example, in the case where the high pressure tank 100 is filled with the gas after rapidly consuming the gas in the high pressure tank 100 in a low-temperature environment at an outside air temperature of −40° C. or less (for example, continuous travel on a highway), there is a possibility that stress may be concentrated on the liner 20. This is because the gas in the liner 20 adiabatically expands as the gas in the high pressure tank 100 is rapidly consumed and thus the temperature in the liner 20 decreases to the outside air temperature or less, whereby the liner 20 contracts. In a case where the liner 20 contracts, there may be cases where a gap is formed between the liner 20 and the fiber reinforced resin layer 30. In a case where the high pressure tank 100 is filled with the gas in a state in which a gap is formed between the liner 20 and the fiber reinforced resin layer 30, stress is concentrated on the liner 20.

According to the first embodiment, in the temperature increasing step (step S103), the fiber reinforced resin layer 30 and the resin layer 40 are increased in temperature so that the period during which the viscosity of the fiber reinforced resin layer 30 decreases and the period during which the viscosity of the resin layer 40 decreases overlap. Therefore, in the temperature increasing step (step S103), the movement of the gas from the liner 20 side to the outside via the fiber reinforced resin layer 30 and the resin layer 40 becomes easy. Therefore, the gas permeation paths 50 are formed more efficiently in a larger amount.

According to the first embodiment, in the pressure regulating step (step S104), in the period pe1 of the period pe during which the temperature increasing step (step S103) is performed, the pressure in the liner 20 is caused to be regulated to be the second pressure P2. Therefore, a burden on the liner 20 due to the pressure in the liner 20 is further reduced.

B. Second Embodiment

B1. High Pressure Tank According to Second Embodiment

In the second embodiment, the strength of the resin layer 40 is not particularly limited, but the strength of the resin layer 40 may be lower than the strength of the fiber reinforced resin layer 30. The second embodiment is different from the first embodiment in that the strength of the resin layer 40 is lower than the strength of the fiber reinforced resin layer 30. In the following description, the same elements as in the first embodiment are denoted by the same reference numerals as in the first embodiment, and the description thereof will be omitted. In the second embodiment, fracture toughness is used for comparison between the strength of the resin layer 40 and the strength of the fiber reinforced resin layer 30. Fracture toughness is evaluated based on a fracture toughness value obtained by a plane-strain fracture toughness test ($K_{IC}$ test) specified in the American Society for Testing and Materials (ASTM) standard E399 (hereinafter, simply referred to as "fracture toughness value").

In the second embodiment, the thermosetting resin used in the glass fiber reinforced resin layer 35 and the resin layer 40 has a relatively low fracture toughness compared to the thermosetting resin used in the carbon fiber reinforced resin layer 31. Accordingly, the strength of the resin layer 40 is decreased. In the second embodiment, the fracture toughness of the thermosetting resin is adjusted by changing the amount of rubber (for example, modified acrylic resin) added thereto. As the amount of rubber added to the thermosetting resin increases, the fracture toughness value of the thermosetting resin decreases. Hereinafter, the fracture toughness value of the thermosetting resin forming the resin layer 40 is simply referred to as the "fracture toughness value of the resin layer 40". In the second embodiment, the amount of rubber added is adjusted so that the fracture toughness value of the resin layer 40 reaches 1.7 MPa·m$^{0.5}$ or less.

Figures 7, 8:
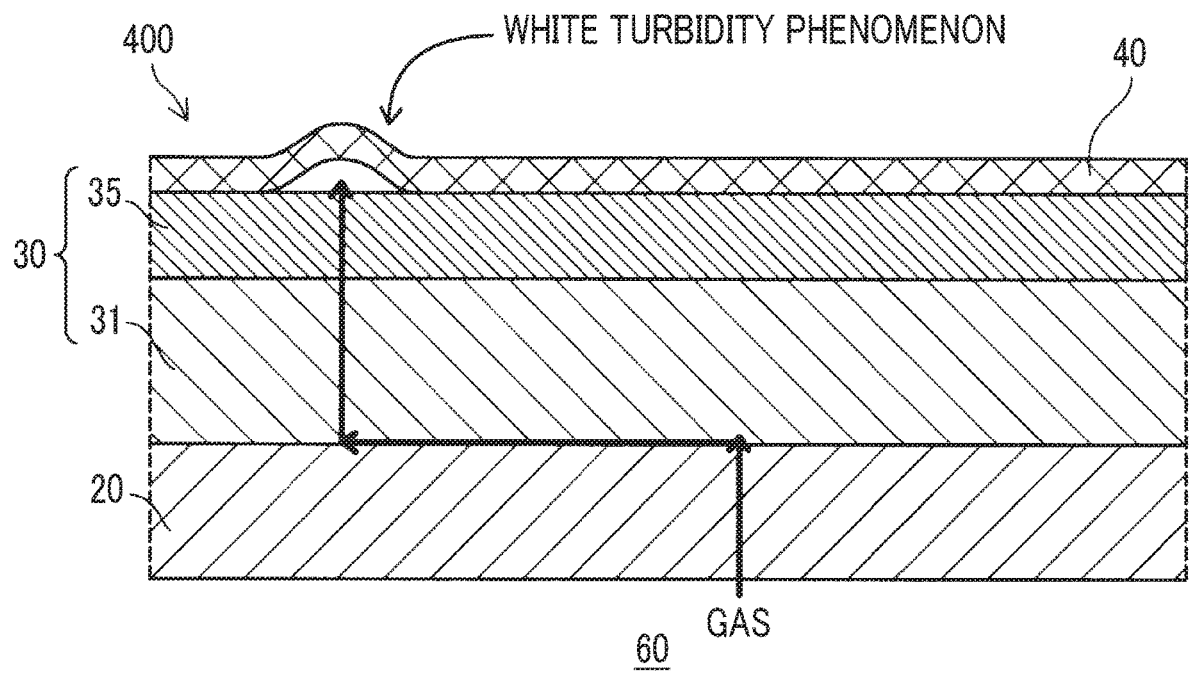
FIG. 7 is a table showing a relationship between a fracture toughness value of a resin layer and occurrence of a white turbidity phenomenon in a second embodiment.
FIG. 8 is a schematic view of a sectional structure of a high pressure tank according to a first experimental example in the second embodiment.

B2. Investigation of Performance of High Pressure Tank Using Experimental Examples FIG. 7 is a table showing the relationship between the fracture toughness value of the resin layer and the occurrence of a white turbidity phenomenon. FIG. 8 is a schematic view of a sectional structure of a high pressure tank 400 according to a first experimental example in the second embodiment. A performance investigation was conducted to investigate the relationship between the fracture toughness value of the resin layer and the occurrence of a white turbidity phenomenon using the experimental examples. FIG. 7 is prepared based on a result obtained by filling the high pressure tank 400 according to first to fourth experimental examples with gas (hydrogen) and visually checking the occurrence of a white turbidity phenomenon. The white turbidity phenomenon is a phenomenon in which, in a case where the gas filling the high pressure tank 400 passes through the liner 20 and moves toward the fiber reinforced resin layer 30 side, the moved gas stays between the fiber reinforced resin layer 30 and the resin layer 40 and a gas reservoir is formed.

In a manufacturing process of the high pressure tank 400 according to the experimental examples in the second embodiment, the pressure regulating step (step S104) in the first embodiment is not performed. Therefore, compared to the high pressure tank 100 according to the first embodiment, in the high pressure tank 400 according to the experimental examples in the second embodiment, the gas permeation paths 50 are not formed more efficiently in a manufacturing stage. The same elements of the high pressure tank 400 according to the experimental examples in the second embodiment as in the high pressure tank 100 according to the first embodiment are denoted by the same reference numerals, and the detailed description thereof will be omitted. In experiments, the high pressure tanks 400 according to first to fourth experimental examples, which are four kinds of high pressure tanks with different fracture toughness values in the resin layers 40 were used. The fracture toughness value of the resin layer 40 in the high pressure tank 400 according to the first experimental example is 1.9 MPa·m$^{0.5}$. The fracture toughness value of the resin layer 40 in the high pressure tank 400 according to the second experimental example is 1.7 MPa·m$^{0.5}$. The fracture toughness value of the resin layer 40 in the high pressure tank 400 according to the third experimental example is 1.4 MPa·m$^{0.5}$. The fracture toughness value of the resin layer 40 in the high pressure tank 400 according to the fourth experimental example is 0.8 MPa·m$^{0.5}$.

As shown in FIG. 7, in the high pressure tank 400 according to the first experimental example in which the fracture toughness value of the resin layer 40 was 1.9 MPa·m$^{0.5}$, the occurrence of a white turbidity phenomenon was confirmed. As shown in FIG. 8, in the high pressure tank 400, in a case where the gas filling the internal space 60 passes through the liner 20 and moves to the fiber reinforced resin layer 30 side, the gas moves to the resin layer 40 side through the region containing fiber and voids with relatively high gas permeability in the fiber reinforced resin layer 30. Since the gas permeation paths 50 are not formed in the resin layer 40, the gas moved to the resin layer 40 side remains between the fiber reinforced resin layer 30 and the resin layer 40. Therefore, in the high pressure tank 400 according to the first experimental example, a white turbidity phenomenon occurs compared to the high pressure tank 100 according to the first embodiment. In a case where a white turbidity phenomenon occurs, the following problems may be incurred. For example, when the high pressure tank is filled with the gas, pressure is applied from the liner side to a gas reservoir, and there is a possibility that the resin layer may be broken by the pressure applied to the gas reservoir. In this case, sound is generated when the resin layer is broken, and there is a possibility that the user of the high pressure tank may feel uneasy. For example, the aesthetic appearance of the high pressure tank may be impaired by the white turbidity phenomenon.

As shown in FIG. 7, in the high pressure tanks 400 according to the second to fourth experimental examples in which the fracture toughness value of the resin layer 40 was 1.7 MPa·m$^{0.5}$ or less, the occurrence of a white turbidity phenomenon was not confirmed. In the high pressure tanks 400 according to the second to fourth experimental examples, in a case where the gas filling the internal space 60 passes through the liner 20 and moves to the fiber reinforced resin layer 30 side, the gas moves to the resin layer 40 side through the region containing fiber with relatively high gas permeability in the fiber reinforced resin layer 30. Since the gas permeation paths 50 are not formed in the resin layer 40, the gas moved to the resin layer 40 side temporarily remains between the fiber reinforced resin layer 30 and the resin layer 40. The fracture toughness values of the resin layers 40 in the high pressure tanks 400 according to the second to fourth experimental examples are lower than the fracture toughness value of the high pressure tank 400 according to the first experimental example. Accordingly, in the high pressure tanks 400 according to the second to fourth experimental examples, compared to the high pressure tank 400 according to the first experimental example, the gas can easily move by pushing the resin layer 40. Therefore, even in a case where the gas temporarily accumulates between the fiber reinforced resin layer 30 and the resin layer 40, the gas that has accumulated by pushing the resin layer 40 is released to the outside. Therefore, in the high pressure tanks 400 according to the second to fourth experimental examples, even in a case where the gas permeation paths 50 are not sufficiently formed, the occurrence of the white turbidity phenomenon can be further suppressed. As the gas moves by pushing the resin layer 40, gaps are formed in the resin layer 40. The gaps formed in the resin layer 40 function as the gas permeation paths 50. That is, in the high pressure tanks 400 according to the second to fourth experimental examples, the gas permeation paths 50 can be formed after manufacturing the high pressure tank 400. Since the fracture toughness values of the high pressure tanks 400 according to the second to fourth embodiments are lower than the fracture toughness value of the high pressure tank 400 according to the first embodiment, the sound generated when the resin layer 40 is pushed by the gas in the second to fourth experimental examples is smaller than the sound generated when the resin layer 40 in the first experimental example is broken. Therefore, the possibility that the user of the high pressure tank feels uneasy is further reduced.

According to the second embodiment described above, the fracture toughness value of the resin layer 40 is adjusted to be 1.7 MPa·m$^{0.5}$ or less. For example, in a case where the gas permeation paths 50 are blocked due to the use of the high pressure tank 100 for a long period of time, there is a possibility that the gas permeability of the resin layer 40 may decrease. Even in a case where the gas permeability of the resin layer 40 decreases after the manufacturing of the high pressure tank 100, in the high pressure tank 100, the gas moves by pushing the resin layer 40, so that the gas temporarily accumulated between the fiber reinforced resin layer 30 and the resin layer 40 can be released to the outside. Therefore, in the high pressure tank 100, even in a case where the gas permeation paths 50 are blocked and the gas permeability of the resin layer 40 decreases, the occurrence of a white turbidity phenomenon can be further suppressed. As the gas moves by pushing the resin layer 40, a new gas permeation path 50 can be formed even after the manufacturing.

According to the second embodiment, since the high pressure tank 400 is manufactured using the same manufacturing method as in the first embodiment, the gas permeation paths 50 can be more efficiently formed in the resin layer 40, so that it is possible to increase the gas permeability in the resin layer 40.

C. Third Embodiment

Figure 9:
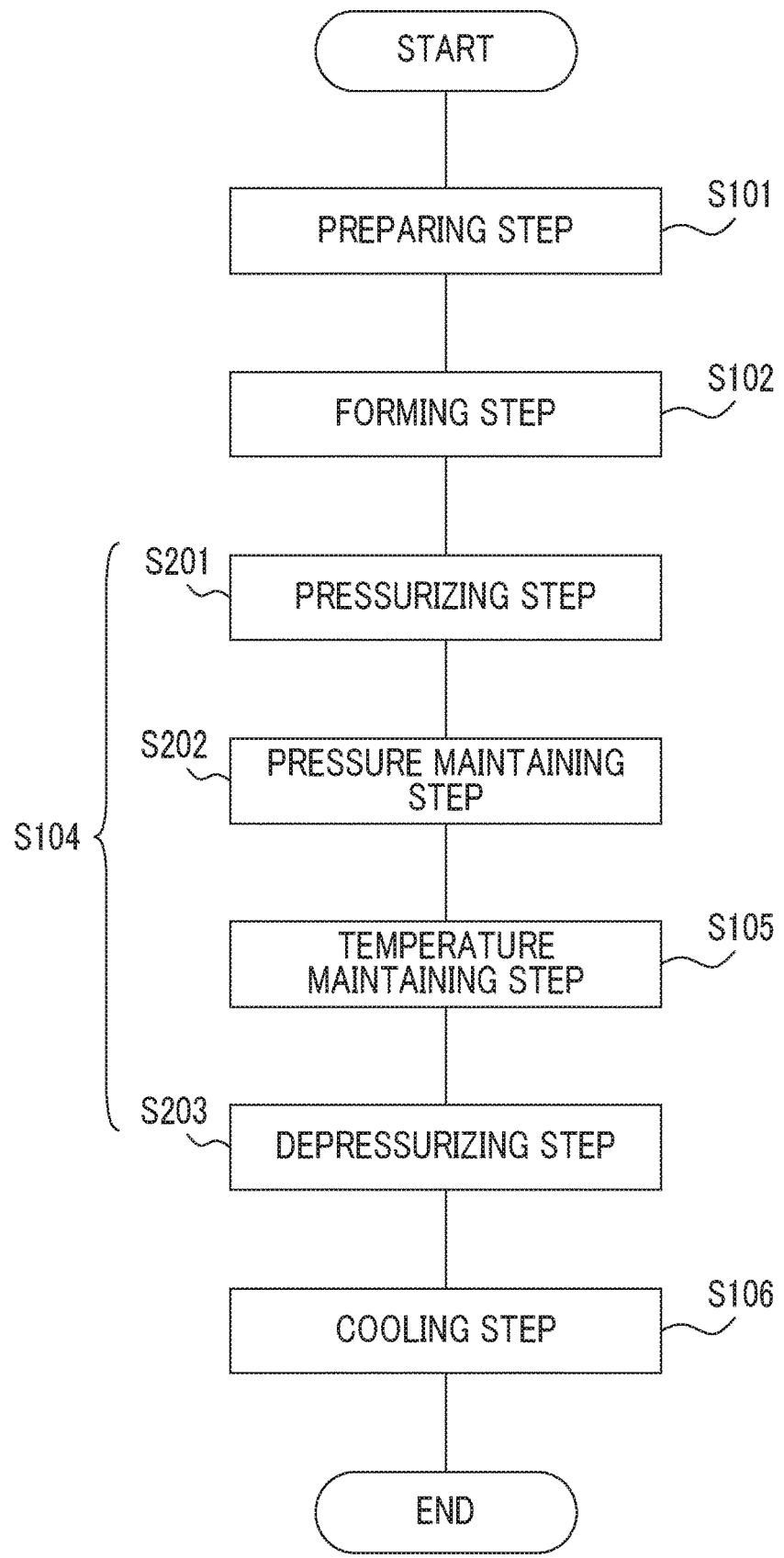
FIG. 9 is a flowchart for describing a manufacturing process of a high pressure tank according to a third embodiment.
Figure 10:
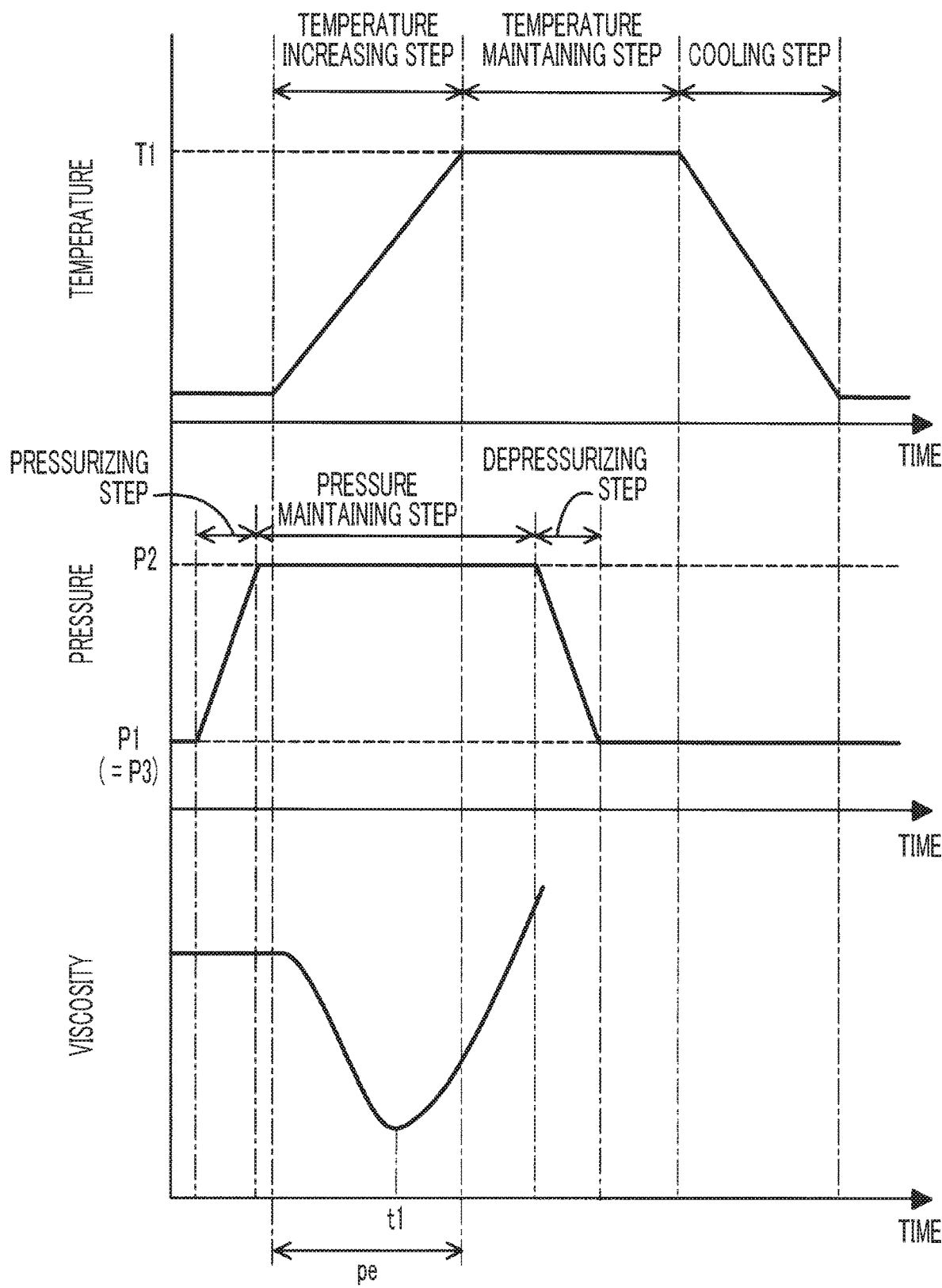
FIG. 10 is a graph showing a relationship between a pressure regulating step and a temperature increasing step in the third embodiment.

FIG. 9 is a flowchart for describing a manufacturing process of the high pressure tank 100 according to a third embodiment. FIG. 10 is a graph showing the relationship between the pressure regulating step and the temperature increasing step in the third embodiment. The third embodiment is different from the first embodiment in that the pressure in the liner 20 is increased from the first pressure P1 to the second pressure P2 between the forming step (step S102) and the temperature increasing step (step S103). Accordingly, as shown in FIG. 10, the pressure in the liner 20 is maintained at the second pressure P2 during the entire period pe during which the temperature increasing step (step S103) is performed. In the third embodiment, the pressurizing step (step S201) is performed after the preparing step (step S101) and the forming step (step S102) and before the temperature increasing step (step S103). After the pressurizing step (step S201), the pressure maintaining step (step S202) is started. The temperature increasing step (step S103) is performed while the pressure maintaining step (step S202) is being performed. Therefore, when the temperature increasing step (step S103) is started, the pressure in the liner 20 reaches the second pressure P2. After the temperature increasing step (step S103) is completed and the temperature maintaining step (step S105) is started, the pressure maintaining step (step S202) is completed and the depressurizing step (step S203) is started. Therefore, the pressure in the liner 20 is maintained at the second pressure P2 during the period pe from the start of the temperature increasing step (step S103) to the completion thereof. When the temperature maintaining step (step S105) is completed, the cooling step (step S106) is started. In the third embodiment, the depressurizing step (step S203) is performed after the temperature maintaining step (step S105) is started, but the depressurizing step (step S203) is not limited thereto. For example, the depressurizing step (step S203) may be performed simultaneously with the start of the temperature maintaining step (step S105) or after completion of the temperature maintaining step (step S105).

According to the third embodiment described above, since the pressure in the liner 20 is caused to be regulated to be the second pressure P2 during the entire period pe during which the temperature increasing step (step S103) is performed, complexity of pressure control is further suppressed. According to the third embodiment, as in the first embodiment, it is possible to more efficiently form the gas permeation paths 50 in the manufacturing process of the high pressure tank 100.

D. Fourth Embodiment

In the first to third embodiments, the temperature increasing rate in the temperature increasing step (step S103) is not particularly limited, but the temperature increasing rate in the temperature increasing step (step S103) may be high. A high temperature increasing rate means that rapid heating is being performed in the temperature increasing step (step S103). The extent of rapid heating is, for example, heating to an extent that an increase in the viscosity of the fiber reinforced resin layer 30 due to the curing reaction starts at a temperature higher than the temperature at which a thermal curing reaction, which is a polymerization reaction between the thermosetting resin and a curing agent, starts.

Figure 11:
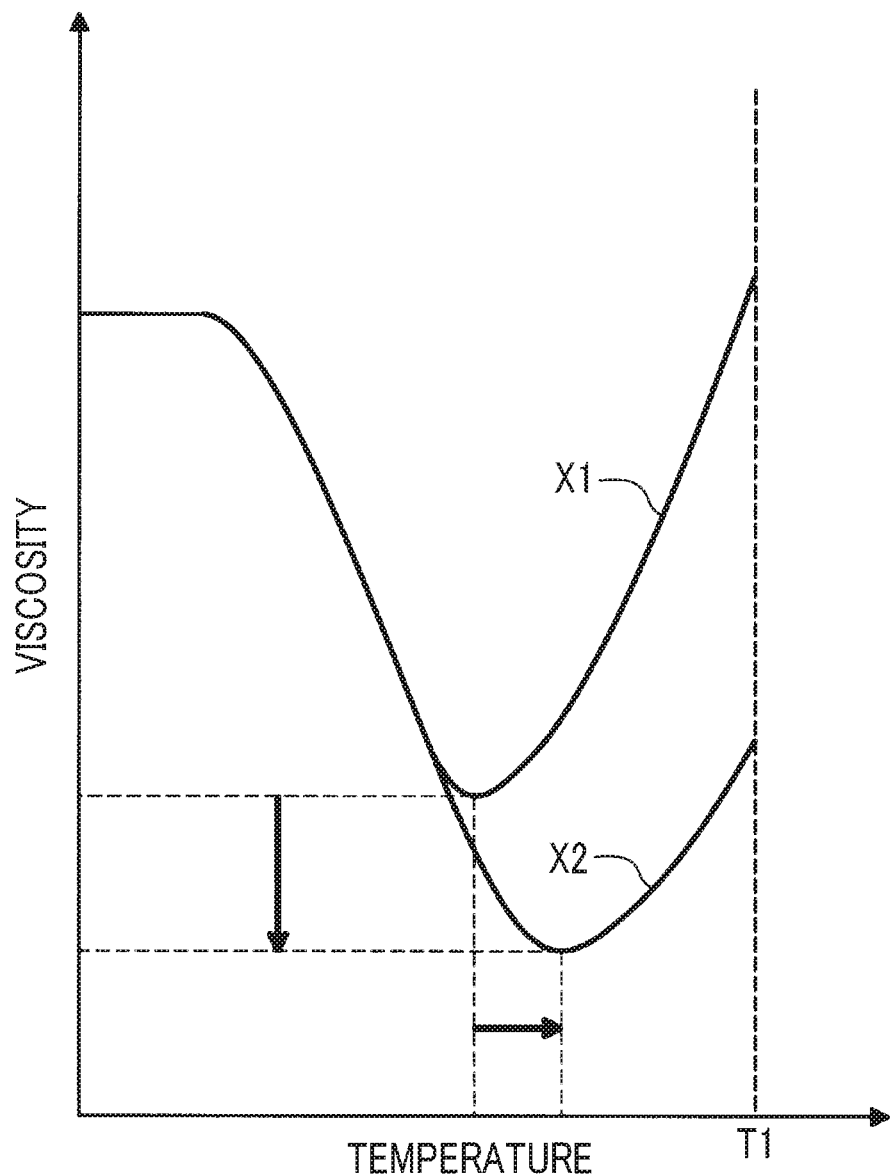
FIG. 11 is a graph showing a relationship between a temperature and a change in a viscosity of a thermosetting resin in a fourth embodiment.

FIG. 11 is a graph showing the relationship between the temperature and a change in the viscosity of the thermosetting resin in a fourth embodiment. Two curves X1 and X2 shown in FIG. 11 show the relationships between the temperature and the viscosity of the thermosetting resin when the fiber reinforced resin layer 30 and the resin layer 40 are increased in temperature to the target temperature T1 under different conditions of temperature increasing rate. The temperature increasing rate in the curve X1 is higher than the temperature increasing rate in the curve X2. As shown in FIG. 11, in the condition (curve X2) with a high temperature increasing rate, the lowest viscosity, which is the minimum value of the viscosity, is lower than in the condition (curve X1) with a relatively low temperature increasing rate. This is because, during an induction period which is a period from the start of the thermal curing reaction of the thermosetting resin to the increase in the viscosity of the thermosetting resin, the decrease in viscosity due to the temperature increase proceeds more significantly in the condition with a high temperature increasing rate than in the condition with a relatively low temperature increasing rate. Therefore, in a case where the temperature increasing rate is high, the temperature increase during the induction period increases, so that the lowest viscosity in the temperature increasing step and the temperature maintaining step is low.

According to the fourth embodiment described above, the temperature increasing rate in the temperature increasing step (step S103) is high. This makes it possible to relatively decrease the lowest viscosity of the thermosetting resin compared to the case where the temperature increasing rate in the temperature increasing step (step S103) is relatively low. Accordingly, the movement of bubbles in the thermosetting resin is facilitated, so that the formation of the gas permeation paths 50 is further facilitated. By decreasing the viscosity at the start of the increase in the viscosity due to the thermal curing, the period during which the viscosity of the thermosetting resin is a viscosity at which bubbles can move is further lengthened. Therefore, the period during which the gas permeation paths 50 are formed is lengthened, and the gas permeation paths 50 can be more efficiently formed.

E. Other Embodiments

E1. First Another Embodiment

In the embodiments, a mixed gas of helium and nitrogen is used as the gas to be sealed in the liner 20. However, the gas to be sealed in the liner 20 is not limited thereto. For example, as the inert gas having a molecular weight of 40 or less, hydrogen, helium, nitrogen, neon, or argon can be used. Since the inert gas has a molecular weight of 40 or less, the permeability of the liner 20 is relatively high. The inert gas may be a mixed gas or a single kind of gas. Although not particularly limited, it is desirable that the inert gas is any one kind of gas or a mixed gas of a plurality of gases selected from a gas group of hydrogen, helium, nitrogen, and argon. In this case, the inert gas has high permeability through the liner 20, and it is possible to further reduce the manufacturing cost compared to other inert gases. The gas sealed in the liner 20 is not limited to the inert gas having a molecular weight of 40 or less. For example, xenon may be used. The gas sealed in the liner 20 may not be an inert gas. For example, the air may be used. In a case where the air is used, the cost for preparing the gas to be sealed in the liner 20 can be further reduced.

E2. Second Another Embodiment

In the embodiments, the same gas is used as the gas sealed in the liner 20 in the forming step (step S102) and the pressurizing step (step S201). However, in the forming step (step S102) and the pressurizing step (step S201), different gases may be used.

E3. Third Another Embodiment

In the embodiments, the depressurizing step (step S203) is performed simultaneously with the start of the temperature maintaining step (step S105), but the depressurizing step (step S203) is not limited thereto. For example, the depressurizing step (step S203) may be performed before the completion of the temperature increasing step (step S103) or after the start of the temperature maintaining step (step S105). Even in this case, in the pressure regulating step (step S104), the pressure in the liner 20 can be caused to be regulated to be the second pressure P2 in the period pe1 of the period pe during which the temperature increasing step (step S103) is performed.

E4. Fourth Another Embodiment

In the embodiments, in the temperature increasing step (step S103), the workpiece 80 is heated from both the inside and the outside. However, a method of heating the workpiece 80 is not limited thereto. For example, heating from the inside of the workpiece 80 may not be performed. In the embodiments, the heating from the inside is performed by heating the rotating portion 212 with the IR heater 220, but the heating method is not limited thereto. For example, in the pressurizing step (step S201), heating may be performed by sealing a gas at a high temperature in the liner 20.

E5. Fifth Another Embodiment

In the embodiments, the pressure in the liner 20 in the forming step (step S102) is adjusted to be the first pressure P1, but is not limited thereto. For example, the pressure in the liner 20 may be changed in response to the progress of the forming step (step S102). Since the fiber reinforced resin layer 30 for protecting the liner 20 is formed as the forming step (step S102) proceeds, the liner 20 can withstand a higher internal pressure. The closer the fiber reinforced resin is to the outside, the higher the pressure is applied to the fiber reinforced resin wound around the liner 20. Therefore, the pressure in the liner 20 may be increased as the forming step (step S102) proceeds. In this case, in the forming step (step S102), the pressure that is the highest among the pressures in the liner 20 corresponds to the first pressure.

Even in the first to fifth other embodiments, as in the first to fourth embodiments, the gas permeation paths 50 can be formed more efficiently.

E6. Sixth Another Embodiment

In the first embodiment, in the period pe1 including time t1 at which the viscosity of the thermosetting resin becomes the lowest viscosity in the period pe during which the temperature increasing step (step S103) is performed, the pressure regulating step (step S104) in which the pressure in the liner 20 is caused to be regulated to be the second pressure P2 higher than the first pressure P1. However, the period pe1 during which the pressure regulating step (step S104) is performed is not limited thereto. For example, in a period not including time t1 in the period pe, that is, in a period before or after time t1 in the period pe, the pressure regulating step (step S104) in which the pressure in the liner 20 is caused to be regulated to be the second pressure P2 higher than the first pressure P1 may be performed. Even in this case, the viscosity of the thermosetting resin in the period during which the pressure regulating step (step S104) is performed is lower than the viscosity of the thermosetting resin of which curing is completed in the temperature maintaining step (step S105). Therefore, compared to a case where the liner 20 is not pressurized over the entire period pe, the gas permeation paths 50 can be more efficiently formed.

E7. Seventh Another Embodiment

In the second embodiment, the resin layer 40 is adjusted to be 1.7 MPa·m$^{0.5}$ or less by changing the amount of rubber added to the thermosetting resin. A method of adjusting the fracture toughness of the resin layer 40 is not limited thereto. For example, the fracture toughness may be adjusted by changing the kind of thermosetting resin or sizing agent used for the fiber reinforced resin layer 30. The fracture toughness value may be decreased by not performing a vacuum defoaming treatment when the fiber reinforced resin and the curing agent are stirred together. Even in this case, the fracture toughness value of the resin layer 40 can be adjusted to be 1.7 MPa·m$^{0.5}$ or less. Therefore, similarly to the second embodiment, the high pressure tank 100 can further suppress the occurrence of a white turbidity phenomenon even in a case where the gas permeation paths 50 are blocked and the gas permeability of the resin layer 40 decreases. As the gas moves by pushing the resin layer 40, a new gas permeation path 50 can be formed even after the manufacturing.

E8. Eighth Another Embodiment

In the fourth embodiment, the lowest viscosity of the thermosetting resin is lowered by increasing the temperature increasing rate, but is not limited thereto. For example, the lowest viscosity of the thermosetting resin may be lowered by changing the kind of cure accelerator or thermosetting resin. In a case where the thermosetting resin has a viscosity at which bubbles can move without lowering the lowest viscosity, the lowest viscosity may not be lowered.

E9. Ninth Another Embodiment

In the embodiments, the liner 20 may have another structure. For example, the liner 20 may have a structure having a tank element body portion formed of a resin having no gas barrier properties and a liner portion which a membrane structure formed of a resin having gas barrier properties lined on the inner wall surface of the tank element body portion.

E10. Tenth Another Embodiment

In the embodiments, the fiber reinforced resin layer 30 may have another structure. For example, the fiber reinforced resin layer 30 may be formed using another fiber reinforced resin such as an aramid fiber reinforced resin. In the forming step (step S102), the fiber reinforced resin layer 30 may be formed by winding the fiber reinforced resin around the outer side of the liner 20 using a method other than the FW method (for example, a resin transfer molding (RTM) method or braiding method). In a case where the thermosetting resin is used for the fiber reinforced resin layer 30, the resin layer 40 can be formed, so that it is possible to efficiently form the gas permeation paths 50 by the same method.

The disclosure is not limited to the embodiments described above, and can be realized in various configurations without departing from the spirit of the disclosure. For example, technical features in the embodiments corresponding to technical features in the aspects described in "SUMMARY" can be appropriately replaced or combined. Unless the technical features are described as being indispensable in this specification, the technical features can be appropriately deleted.

What is claimed is:

1. A method of manufacturing a high pressure tank, the method comprising:
   preparing a liner having an internal space to be filled with a gas;
   winding a fiber reinforced resin in which a fiber is impregnated with a thermosetting resin around an outer side of the liner, forming a fiber reinforced resin layer which is a layer of the fiber reinforced resin on the outer side of the liner, and a resin layer which is a layer formed of a portion of the thermosetting resin on an outer surface of the fiber reinforced resin layer;
   increasing a temperature of the fiber reinforced resin layer and the resin layer to a predetermined temperature which is a temperature at which the thermosetting resin is cured;
   causing, in at least a potion of a period during which the increasing of the temperature is performed, a pressure in the liner to be regulated to be a second pressure higher than a first pressure which is a pressure in the liner in the forming of the fiber reinforced resin layer and the resin layer; and
   maintaining the temperature of the fiber reinforced resin layer and the resin layer at the predetermined temperature after the increasing of the temperature;
   wherein:
   the causing of the pressure in the liner to be regulated has
      increasing the pressure in the liner from the first pressure to the second pressure,
      maintaining the pressure in the liner at the second pressure after the increasing of the pressure, and
      decreasing the pressure in the liner to a third pressure lower than the second pressure after the maintaining of the pressure;
   wherein the maintaining of the pressure is performed in a portion of the period during which the increasing of the temperature is performed; and
   wherein the step of decreasing the pressure is completed before the step of maintaining the temperature is completed.

2. The method according to claim 1, wherein, in the increasing of the pressure, the pressure in the liner is increased to the second pressure by sealing an inert gas in the liner.

3. The method according to claim 2, wherein the inert gas is at least one of hydrogen, nitrogen, helium, and argon.

4. The method according to claim 1, wherein a fracture toughness value of the resin layer formed by the forming of the fiber reinforced resin layer and the resin layer is 1.7 MPa·m$^{0.5}$ or less.

5. The method according to claim 1, wherein a fracture toughness value of the resin layer formed by the forming of the fiber reinforced resin layer and the resin layer is 1.4 MPa/m or less.

6. A method of manufacturing a high pressure tank, the method comprising:
   preparing a liner having an internal space to be filled with a gas;
   by winding a fiber reinforced resin in which a fiber is impregnated with a thermosetting resin around an outer side of the liner, forming a fiber reinforced resin layer which is a layer of the fiber reinforced resin on the outer side of the liner, and a resin layer which is a layer formed of a portion of the thermosetting resin on an outer surface of the fiber reinforced resin layer;
   increasing a temperature of the fiber reinforced resin layer and the resin layer to a predetermined temperature which is a temperature at which the thermosetting resin is cured;
   causing a pressure in the liner to be regulated to be a second pressure higher than a first pressure which is a pressure in the liner in the forming of the fiber reinforced resin layer and the resin layer; and
   maintaining the temperature of the fiber reinforced resin layer and the resin layer at the predetermined temperature after the increasing of the temperature;
   wherein the causing of the pressure in the liner to be regulated comprises:
   increasing the pressure in the liner from the first pressure to the second pressure, the increasing of the pressure being performed between the forming of the fiber reinforced resin layer and the resin layer and the increasing of the temperature, and
   maintaining the pressure in the liner at the second pressure during an entire period during which the increasing of the temperature is performed;
   wherein a step of decreasing the pressure is completed before the step of maintaining the temperature is completed and further comprising
   decreasing the pressure in the liner to a third pressure lower than the second pressure after the maintaining of the pressure.

* * * * *